United States Patent [19]

Schultz

[11] 4,177,017
[45] Dec. 4, 1979

[54] PUMP SYSTEM FOR CRYOGENIC LIQUID DELIVERY VEHICLES

[75] Inventor: Jeffrey A. Schultz, East Rochester, N.H.

[73] Assignee: Process Engineering, Inc., Plaistow, N.H.

[21] Appl. No.: 912,540

[22] Filed: Jun. 5, 1978

Related U.S. Application Data

[63] Continuation of Ser. No. 741,193, Nov. 12, 1976, abandoned.

[51] Int. Cl.² ........................ F04B 9/08; F04B 17/00; F17C 7/02; B60P 3/22
[52] U.S. Cl. .................................. 417/231; 417/390; 62/55; 62/239; 280/5 E
[58] Field of Search ............... 417/364, 390, 231, 234; 180/53 R; 62/55, 239; 280/5 E; 222/626, 627

[56] References Cited

U.S. PATENT DOCUMENTS

| | | | |
|---|---|---|---|
| 2,060,484 | 11/1936 | Barrett | 222/267 |
| 2,506,911 | 5/1950 | Ziegler | 417/390 |
| 2,528,131 | 10/1950 | Garretson | 417/390 |
| 2,638,224 | 5/1953 | Rupp | 417/234 |
| 3,279,382 | 10/1966 | Bennett | 417/390 |
| 3,279,383 | 10/1966 | Smith | 417/234 |
| 3,567,342 | 3/1971 | Jackson | 417/364 |
| 3,796,518 | 3/1974 | Weaver | 417/364 |
| 3,853,272 | 12/1974 | Decker et al. | 417/390 |

Primary Examiner—Carlton R. Croyle
Assistant Examiner—Thomas I. Ross
Attorney, Agent, or Firm—Wolf, Greenfield & Sacks

[57] ABSTRACT

The system is used for pumping cryogenic liquids from delivery vehicles including trucks, semi-trailers and trailers. An internal combustion engine is mounted at the forward end of the vehicle or, in the case of a trailer truck at the forward end of the trailer, and drives a variable displacement hydrostatic transmission which comprises a hydraulic pump driven directly from the output shaft of the internal combustion engine. The transmission also comprises a high speed hydraulic motor coupled by hydraulic lines with the hydraulic pump and arranged in a closed loop system. The hydraulic motor is disposed at a rear end of the vehicle (trailer) and has its output shaft coupled directly to the cryogenic delivery pump of the vehicle. A control panel is mounted in a rear compartment of the vehicle and allows the operator to control, inter alia, engine speed, hydrostatic drive speed and cryogenic pump output pressure.

4 Claims, 2 Drawing Figures

PUMP SYSTEM FOR CRYOGENIC LIQUID DELIVERY VEHICLES

This is a continuation of application Ser. No. 741,193, filed Nov. 12, 1976, now abandoned.

BACKGROUND OF THE INVENTION

The present invention relates in general to an improved pumping system for use with liquid delivery vehicles. More particularly, the system of the present invention is a hydraulic system preferably for use with cryogenic liquid delivery vehicles.

Because it is dangerous to have hydrocarbons in proximity to the liquid cryogenic pump the cryogenic pump is usually disposed at the rear of the delivery vehicle or trailer and is separated a substantial distance from a drive for the cryogenic pump such as an internal combustion engine. In many cases the liquid cryogenic that is being delivered is oxygen which is dangerous when in proximity to the hydrocarbons commonly present about an internal combustion engine. Some prior systems provide a mechanical coupling that must extend a substantial distance between the internal combustion engine and the cryogenic pump. This internal combustion engine may be the engine powering the vehicle or may be a separate engine. This relatively long mechanical coupling arrangement is undesirable requiring excessive maintenance characterized by other operating problems. Another prior art technique is to use an extremely large alternator driven from the vehicle engine. This arrangement has also been found to be inefficient and troublesome.

Accordingly, one object of the present invention is to provide an improved pumping system for use on a liquid delivery vehicle for pumping preferably cryogenic liquids.

Another object of the present invention is to provide a hydraulic or a hydrostatic pumping system. In accordance with the invention for use with a trailer truck a separate internal combustion engine is used to drive a variable displacement hydrostatic transmission which in turn drives a liquid cryogenic delivery pump. The components of the hydrostatic transmission comprise a hydraulic pump coupled by hydraulic lines to a high speed hydraulic motor which is directly coupled to the cryogenic pump.

A further object of the present invention is to provide a cryogenic pump system that is safe in operation and rugged in construction and overcomes many of the problems associated with prior mechanical coupling systems.

Still another object of the present invention is to provide a cryogenic pump system that is readily adaptable for use with either smaller trucks or semi-trailer trucks or larger trailer trucks.

Still a further object of the present invention is to provide a pumping system that requires a minimum amount of maintenance especially in comparison with prior art systems.

Another object of the present invention is to provide a hydraulic pumping system preferably for use with cryogenic liquids and characterized by a maximum horse power that is available over a broad range of delivery pump speeds. With the system of this invention there is an optimization of the power and economy for the various delivery conditions that may be encountered.

Still a further object of the present invention is to provide a hydraulic system that is of the closed loop type. The closed loop system of the present invention requires a relatively small reserve reservoir tank and also eliminates the need for auxiliary valves which are usually necessary in an open loop system.

SUMMARY OF THE INVENTION

To accomplish the foregoing and other objects of this invention there is provided a pumping system for liquid delivery vehicles and which is adapted preferably for use with vehicles carrying cryogenic liquids. The system comprises an internal combustion engine means which in the case of a trailer truck is disposed at the front section of the trailer remote from the rear section of the trailer where the cryogenic liquid pump is disposed. The engine may be mounted in a conventional manner from a plurality of motor mounts. A hydraulic pump means is operatively coupled from an operates by the internal combustion engine. This hydraulic pump means comprises a part of a complete hydrostatic transmission, the other components of the system comprising a hydraulic motor means which is mounted remote from the hydraulic pump means at the rear of the vehicle (trailer). The hydrostatic transmission also comprises hydraulic fluid line means intercoupled between the hydraulic pump and motor means thereby forming therewith a closed loop hydrostatic transmission system. The output from the hydraulic motor means preferably directly couples to a cryogenic liquid pump which is also disposed at the rear of the vehicle adjacent the motor means. The cryogenic pump is driven from the hydraulic motor means. The hydraulic motor is preferably a high speed motor while the hydraulic pump is preferably a variable displacement hydraulic pump. The displacement ratio for the pump and motor combination (at maximum displacement) may be on the order of 2:1, allowing the hydraulic motor to utilize all of its speed potential if the need arises. The hydraulic pump displacement is controlled by a single arm control in a rear compartment of the vehicle where there is also provided a control panel for controlling or observing such parameters as engine speed, hydrostatic drive speed, and cryogenic pump output pressure.

BRIEF DESCRIPTION OF THE DRAWINGS

Numerous other objects, features and advantages of the invention will now become apparent upon a reading of the following detailed description taken in conjunction with the accompanying drawings, in which.

DETAILED DESCRIPTION

The pumping system of the present invention is preferably a cryogenic pumping system that drives the delivery pump on cryogenic liquid delivery trucks, semi-trailers and trailers. The system comprises an internal combustion engine which is used to drive a variable displacement hydro-static transmission, which in turn drives a liquid cryogenic delivery pump. The hydrostatic transmission comprises components that are remote from each other to provide separation between the liquid cryogenic pump and the drive engine because in many cases the liquid cryogenic is oxygen which is dangerous when in proximity to hydrocarbons, commonly found around internal combustion engines.

Figure 1:
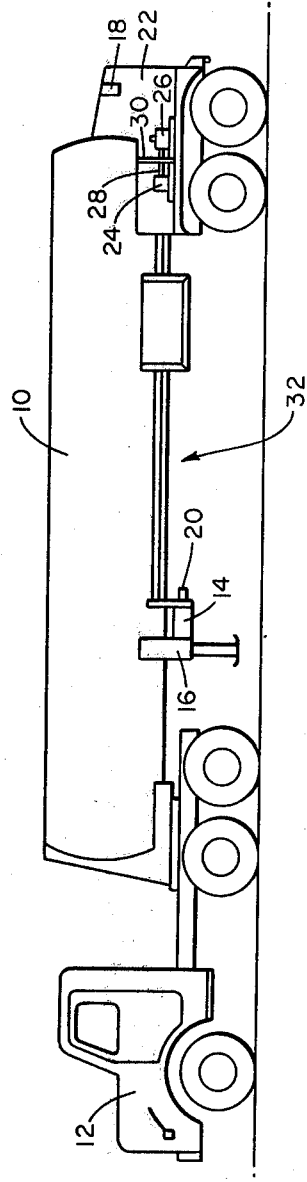
FIG. 1 is a schematic diagram of a trailer truck vehicle and associated pumping system of the present invention.
Figure 2:
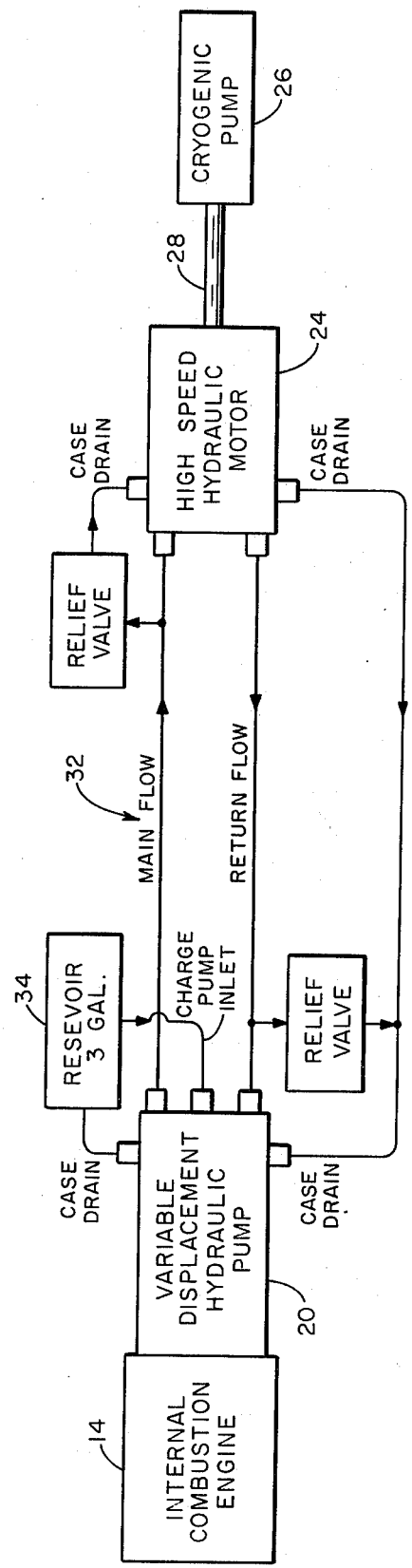
FIG. 2 is a block diagram of the pumping system of the present invention.

In discussing the details of a preferred embodiment of the system reference is now made to FIGS. 1 and 2, which show, respectively, a schematic diagram of a trailer truck vehicle and associated pumping system of the invention and a block diagram of the pumping system of the invention. FIG. 1 shows a conventional trailer truck comprising the trailer portion 10 and the tractor 12. One of the advantages of the system of this invention is that there are no special connections required between the trailer and the tractor. The system of this invention is totally self-contained on the trailer. The primary drive for the system of this invention is provided by a gasoline drive engine 14 which is preferably a Volkswagen engine model 126A industrial engine. The engine is provided with a variable speed (load sensitive) governor, starter, generator, key ignition switch, tachometer, high temperature warning light, low oil pressure warning light, and manual choke. The engine is preferably protected by an automatic shut-off in the event of low oil pressure or excess temperature. The engine is located in a rugged, light weight aluminum cabinet and is disposed under the belly of the trailer just behind the landing gear 16. Some of the controls for the engine or at least the gages are lights to be monitored may be disposed at the rear of the trailer at the control panel 18.

A variable displacement hydraulic pump 20 is mounted directly to the output shaft of the drive engine 14. This hydraulic pump in a preferred embodiment is a Sundstrand hydro-transmission pump series 18 made by Sundstrand Corporation of Ames, Iowa, part No. 18-2014. This pump is capable of handling powers of up to 60 horsepower, and speeds of up to 4000 r.p.m. The engine 14 has an output power of approximately 46 horsepower at 3600 r.p.m. and thus the pump is easily within the operating parameters of the engine 14. The displacement of the pump 20 is controlled by a single arm controller in the rear cabinet 22 where the control panel is disposed. Appropriate linkages (not shown) may be provided between the pump 20 and the cabinet 22 for facilitating control at the cabinet end of the pump. This arm controller provides pump displacements from zero to a maximum displacement. At zero displacement the pump is in "neutral" and no hydraulic flow occurs. At maximum displacement the pump flow is sufficient to cause a speed increase of 2:1 to the hydraulic motor 24. With the hydraulic pumping system of this invention and the provision of a "neutral" position for the pump there is no need for the use of valves which are many times troublesome in operation.

The hydraulic motor 24 is a high speed motor mounted in a common frame with the cryogenic pump 26, coupled by a direct drive shaft 28. An appropriate safety barrier 30 is interposed between the motor 24 and the cryogenic pump 26. As previously mentioned, the motor 24 is a high speed motor capable of transmitting up to 60 horsepower and speeds of up to 7500 r.p.m. In a preferred embodiment the motor may be a Volve motor model No. F11D-19-100-666. The displacement ratio for the pump (at maximum displacement) motor combination is approximately 2:1, allowing the hydraulic motor to utilize all of its speed potential if the need arises. However, due to the horsepower requirements of the cryogenic pump 26, speeds of over 5500 r.p.m. at the hydraulic motor—cryogenic pump shaft are not likely. The 5500 r.p.m. speed is within the operating parameters of the hydraulic motor 24. The hydrostatic transmission of this invention in addition to including the hydraulic pump 20 and hydraulic motor 24 includes fluid connecting lines 32 which, as shown in FIG. 2, include a main flow line and a return flow line intercoupled between the pump and motor. As shown in FIG. 2 the hydraulic system is a closed loop system. With this system the hydraulic fluid is not returned to the reservoir 34 after passing through the system but is cycled continuously from the pump to the motor. A preferred hydraulic fluid for this system is a fire-resistant phosphate-ester composition fluid, with low viscosity for cold weather operation, presently monsanto 29c-LT. This type of system requires a reservoir only to replace lost fluid which is quite minimal. Therefore, a three gallon reservoir can be used instead of the 20–30 gallon reservoir required for open loop systems.

Another advantage to the system of the present invention is that essentially all of the control can be provided from a single location at the rear of the trailer in the cabinet 22. For example, the engine control including the ignition switch, tachometer, warning lights, throttle and choke are all housed in the rear cabinet 22. This allows the operator to control the engine 14 and also the hydraulic drive and the piping controls all from a single location. Preferably, a magnetic pick up is used in association with the shaft 28 for sensing shaft speed. This indication is also displayed on the control panel 18 along with such other parameters as the cryogenic pump output pressure. The control panel 18 is supported in a well known manner in the lading piping control compartment or cabinet 22.

There are many advantages associated with the system of the present invention. For example, in comparison to mechanical systems a system of this invention has far fewer maintenance requirements. Secondly, because the system of this invention has a variable drive ration, maximum horsepower is available over a broad range of delivery pump speeds. This results in maximum power and economy for the various delivery conditions that may be encountered. As previously mentioned the closed loop system is also of noted advantage especially since it requires a much smaller reservoir and does not require the use of auxiliary valves which are usually necessary in an open loop system.

Having described one embodiment of the present invention it should now become apparent to those skilled in the art that numerous modifications can be made in the disclosed embodiment, all of which are contemplated as falling within the scope of the present invention. For example, the principles of the present invention may also be used with a vehicle other than a trailer truck such as a straight truck. In this case the drive engine of the truck itself is utilized to drive the hydraulic pump 20 by means of a transmission power-take-off unit coupled from the presently existing transmission for the vehicle.

What is claimed is:

1. A pumping system for cryogenic liquid delivery vehicles that include a tractor and trailer that is substantially longer than the tractor having forward and rear ends comprising;
   self-contained internal combustion engine means having control means associated therewith,
   means for mounting the internal combustion engine means at a forward end of the trailer remote from the rear end of the trailer, hydraulic pump means also mounted at the forward end of the trailer operatively coupled from and operated by the internal combustion engine means, and having control means for varying the displacement of said hydraulic pump means including a manually-operated control member, said hydraulic pump means operating up to 60 horsepower at speeds up to 4000 r.p.m., a reservoir coupled to the hydraulic pump means, hydraulic motor means, means for mounting the hydraulic motor means at the rear end of the trailer, said hydraulic motor means including a high speed hydraulic motor capable of transmitting up to 60 horsepower at speeds up to 7500 r.p.m., hydraulic fluid line means intercoupled between the hydraulic pump and hydraulic motor means and forming therewith a closed loop hydrostatic transmission system including a main flow line and a return line carrying a hydraulic fluid that is a phosphate-ester composition, means defining an enclosed cabinet at the rear end of the trailer having a control panel, said hydraulic pump control member and internal combustion engine control means being disposed in said cabinet and associated with said control panel, and a cryogenic liquid pump means disposed at the rear end of the trailer adjacent the hydraulic motor means and driven from the hydraulic motor means, said liquid pump means for pumping cryogenic liquid from the vehicle, safety barrier means separating the hydraulic motor means and liquid pump means, said internal combustion engine means being disposed for safety purposes sufficiently remote from said cryogenic liquid pump means.

2. A pumping system as set forth in claim 1 wherein said internal combustion engine means comprises an air-cooled internal combustion engine.

3. A pumping system as set forth in claim 1 wherin said internal combustion engine means is disposed adjacent the belly of the trailer just rearwardly of the landing gear of the trailer.

4. A pumping system as set forth in claim 1 wherein said control member controls displacement between zero and a maximum displacement with zero displacement being a neutral control position without any displacement occurring.

* * * * *